(12) United States Patent
Ryu et al.

(10) Patent No.: US 8,891,045 B2
(45) Date of Patent: Nov. 18, 2014

(54) DISPLAY SUBSTRATE, METHOD OF MANUFACTURING THE DISPLAY SUBSTRATE AND DISPLAY PANEL HAVING THE DISPLAY SUBSTRATE

(71) Applicant: Samsung Display Co., Ltd., Yongin, Gyeonggi-do (KR)

(72) Inventors: Soo-Hye Ryu, Yongin-si (KR); Yi-Seop Shim, Suwon-si (KR); Chang-Soon Jang, Seoul (KR); Chul Huh, Yongin-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 185 days.

(21) Appl. No.: 13/676,648

(22) Filed: Nov. 14, 2012

(65) Prior Publication Data
US 2013/0314652 A1   Nov. 28, 2013

(30) Foreign Application Priority Data

May 25, 2012   (KR) ........................ 10-2012-0055974

(51) Int. Cl.
G02F 1/1333  (2006.01)
G02F 1/1339  (2006.01)
G02F 1/1335  (2006.01)

(52) U.S. Cl.
CPC ...... *G02F 1/133514* (2013.01); *G02F 1/13394* (2013.01); *G02F 1/133371* (2013.01); *G02F 1/133516* (2013.01)
USPC .......................................... 349/108; 349/106

(58) Field of Classification Search
USPC ................................... 349/106, 108
See application file for complete search history.

*Primary Examiner* — Phu Vu
(74) *Attorney, Agent, or Firm* — F. Chau & Associates, LLC

(57) ABSTRACT

A method of manufacturing a display substrate includes forming a first color filter on a base substrate in a first region, forming a second color filter on the base substrate in a second region, forming an organic layer on the base substrate, the first color filter and the second color filter, forming a third color filter on the organic layer in a third region and forming an overcoat layer on the organic layer and the third color filter.

30 Claims, 9 Drawing Sheets

DISPLAY SUBSTRATE, METHOD OF MANUFACTURING THE DISPLAY SUBSTRATE AND DISPLAY PANEL HAVING THE DISPLAY SUBSTRATE

CROSS-REFERENCE TO RELATED APPLICATION

This application claims priority to Korean Patent Application No. 10-2012-0055974, filed on May 25, 2012, the disclosure of which is hereby incorporated by reference herein in its entirety.

TECHNICAL FIELD

Exemplary embodiments of the present invention relate to a display substrate, a method of manufacturing the display substrate and a display panel including the display substrate. More particularly, exemplary embodiments of the present invention relate to a display substrate which increases the display quality, a method of manufacturing the display substrate and a display panel including the display substrate.

DISCUSSION OF THE RELATED ART

Generally, a liquid crystal display apparatus includes a display panel displaying an image using a light transmittance of a liquid crystal and a light source module providing light to the display panel. For example, the light source module may be a backlight assembly.

The display panel may include, for example, a first display substrate having a thin film transistor, a second display substrate having a color filter, and a liquid crystal layer disposed between the first and second display substrates.

Generally, the second display substrate may include, for example, red, green and blue color filters. The red, green and blue color filters may have, for example, the same cell gap between the color filters and the first display substrate as one another.

When the red, green and blue color filters have the uniform cell gap, a color shift defect in which a white coordinate changes according to a position in the display panel may occur. Accordingly, the display quality of the display apparatus may be deteriorated.

BRIEF SUMMARY OF THE INVENTION

Exemplary embodiments of the present invention provide a display substrate capable of decreasing a color shift to increase display quality.

Exemplary embodiments of the present invention also provide a method of manufacturing the display substrate.

Exemplary embodiments of the present invention also provide a display panel including the display substrate.

In accordance with an exemplary embodiment of the present invention, a method of manufacturing a display substrate is provided. The method includes forming a first color filter on a base substrate in a first region, forming a second color filter on the base substrate in a second region, forming an organic layer on the base substrate, the first color filter and the second color filter, forming a third color filter on the organic layer in a third region and forming an overcoat layer on the organic layer and the third color filter.

In an exemplary embodiment, a height of an upper surface of the overcoat layer corresponding to the first color filter and the second color filter may be different from a height of an upper surface of the overcoat layer corresponding to the third color filter.

In an exemplary embodiment, the upper surface of the overcoat layer corresponding to the third color filter may be higher than the upper surface of the overcoat layer corresponding to the first color filter and the second color filter by about 0.2 μm to about 0.3 μm.

In an exemplary embodiment, a thickness of the first color filter, a thickness of the second color filter and a thickness of the third color filter may be substantially the same as one another.

In an exemplary embodiment, the first color filter may be a red color filter. The second color filter may be a green color filter. The third color filter may be a blue color filter.

In an exemplary embodiment, the method may further include forming a column spacer on the overcoat layer.

In an exemplary embodiment, the column spacer may be formed substantially simultaneously with the overcoat layer.

In an exemplary embodiment, the overcoat layer and the column spacer may each include a transparent photo resist material.

In an exemplary embodiment, the overcoat layer and the column spacer may be formed using a mask. The mask may have a hole portion corresponding to the column spacer and a halftone portion not corresponding to the column spacer.

In an exemplary embodiment, the column spacer may be formed in the third region.

In accordance with an exemplary embodiment of the present invention, a display substrate is provided. The display substrate includes a base substrate, a first color filter, a second color filter, an organic layer, a third color filter and an overcoat layer. The first color filter is disposed on the base substrate in a first region. The second color filter is disposed on the base substrate in a second region. The organic layer is disposed on the base substrate, the first color filter and the second color filter. The third color filter is disposed on the organic layer in a third region. The overcoat layer is disposed on the organic layer and the third color filter.

In an exemplary embodiment, a height of an upper surface of the overcoat layer corresponding to the first color filter and the second color filter may be different from a height of an upper surface of the overcoat layer corresponding to the third color filter.

In an exemplary embodiment, the upper surface of the overcoat layer corresponding to the third color filter may be higher than the upper surface of the overcoat layer corresponding to the first color filter and the second color filter by about 0.2 μm to about 0.3 μm.

In an exemplary embodiment, a thickness of the first color filter, a thickness of the second color filter and a thickness of the third color filter may be substantially the same as one another.

In an exemplary embodiment, the first color filter may be a red color filter. The second color filter may be a green color filter. The third color filter is a blue color filter.

In an exemplary embodiment, the display substrate may further include a column spacer disposed on the overcoat layer.

In an exemplary embodiment, the column spacer may include a material substantially the same as a material of the overcoat layer. The column spacer may be integrally formed with the overcoat layer.

In an exemplary embodiment, the column spacer may be disposed in the third region.

In accordance with an exemplary embodiment of the present invention, a display apparatus is provided. The display apparatus includes a first display substrate, a second display substrate and a liquid crystal layer. The first display substrate includes a thin film transistor. The second display substrate faces the first display substrate. The second display substrate includes a base substrate, a first color filter disposed on the base substrate in a first region, a second color filter disposed on the base substrate in a second region, an organic layer disposed on the base substrate, the first color filter and the second color filter, a third color filter disposed on the organic layer in a third region and an overcoat layer disposed on the organic layer and the third color filter. The liquid crystal layer is disposed between the first and second display substrates.

In an exemplary embodiment, a first cell gap between the first and second display substrates corresponding to the first color filter and the second color filter may be different from a second cell gap between the first and second display substrates corresponding to the third color filter.

In an exemplary embodiment, the first cell gap may be greater than the second cell gap by about 0.2 µm to about 0.3 µm.

In accordance with an exemplary embodiment of the present invention, a method for manufacturing a display substrate is provided. The method includes forming a light blocking pattern on a base substrate, and the light blocking pattern defines a first region, a second region and a third region on the base substrate, forming a first color filter on the base substrate in between opposing sidewalls of the light blocking pattern in the first region, forming a second color filter on the base substrate in between opposing sidewalls of the light blocking pattern in the second region, forming an organic layer on the base substrate, the first color filter, and the second color filter, forming a third color filter on the organic layer in between opposing sidewalls of the light blocking pattern in the third region, forming an overcoat layer on the organic layer and the third color filter and forming a column spacer on the overcoat layer.

Moreover, an upper surface of the overcoat layer corresponding to the third color filter is higher than an upper surface of the overcoat layer corresponding to the first color filter and the second color filter.

According to the display substrate, the method of manufacturing the display substrate and the display apparatus including the display substrate of exemplary embodiments of the present invention, a cell gap corresponding to the third color filter may be adjusted by an insulating layer disposed between the third color filter and the base substrate. Thus, a color shift may decrease so that a display quality may be increased.

BRIEF DESCRIPTION OF THE DRAWINGS

Exemplary embodiments of the present invention can be understood in more detail from the following detailed description taken in conjunction with the accompanying drawings, in which.

DETAILED DESCRIPTION OF EXEMPLARY EMBODIMENTS OF THE INVENTION

Figure 1:
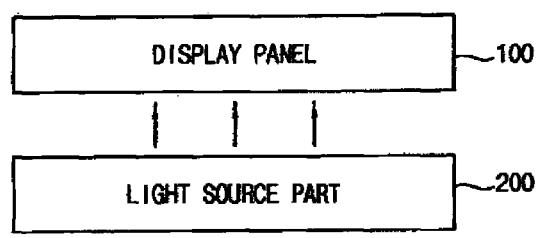
FIG. 1 is a block diagram illustrating a display apparatus according to an exemplary embodiment of the present invention.

Hereinafter, exemplary embodiments of the present invention will be described in further detail with reference to the accompanying drawings.

In the drawings, the thickness of layers, films, panels, regions, etc., may be exaggerated for clarity. It will be understood that when an element such as, for example, a layer, film, region, or substrate is referred to as being "on", "connected to" or "coupled to" another element, it can be directly on, connected to or coupled to the other element or intervening elements may also be present. Like reference numerals designate like elements throughout the specification.

As used herein, the singular forms, "a", "an", and "the" are intended to include plural forms as well, unless the context clearly indicates otherwise.

Figure 2:
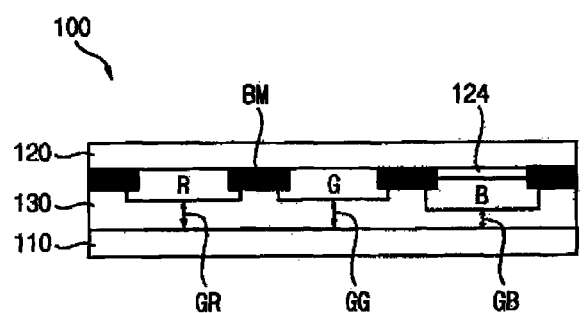
FIG. 2 is a cross-sectional view illustrating a display panel of FIG. 1.

FIG. 1 is a block diagram illustrating a display apparatus according to an exemplary embodiment of the present invention. FIG. 2 is a cross-sectional view illustrating a display panel of FIG. 1.

Referring to FIGS. 1 and 2, the display apparatus includes, for example, a display panel 100 and a light source part 200.

The display panel 100 includes, for example, a first display substrate 110, a second display substrate 120 and a liquid crystal layer 130 disposed between the first and second display substrates 110 and 120.

The first display substrate 110 may be, for example, a thin film transistor ("TFT") substrate including a plurality of TFTs disposed in a matrix form. The first display substrate 110 may further include, for example, a plurality of gate lines and a plurality of data lines connected to the TFTs.

The second display substrate 120 may be, for example, a color filter substrate including a plurality of color filters representing colors in response to a light provided from the light source part 200. The second display substrate 120 includes, for example, a first color filter, a second color filter, and a third color filter. The second display substrate 120 further includes, for example, a light blocking pattern BM disposed between the first to third color filters.

For example, the first color filter may be a red color filter R. The second color filter may be, for example, a green color filter G. The third color filter may be, for example, a blue color filter B. It is noted that exemplary embodiments of the present invention are not limited to a red color filter R, a green color filter G and a blue color filter B. For example, alternatively, the color filters may include a cyan color filter C, a magenta color filter M, a yellow color filter Y and a black color filter BL.

A cell gap is defined as a gap between the first display substrate 110 and the second display substrate 120. A first cell gap GR corresponding to the first color filter R is, for example, substantially the same as a second cell gap GG corresponding to the second color filter G.

A third cell gap GB corresponding to the third color filter B may be, for example, different from the first and second cell gaps GR and GG. The first and second cell gaps GR and GG may be, for example, greater than the third cell gap GB by about 0.2 μm to about 0.3 μm.

Figure 3:
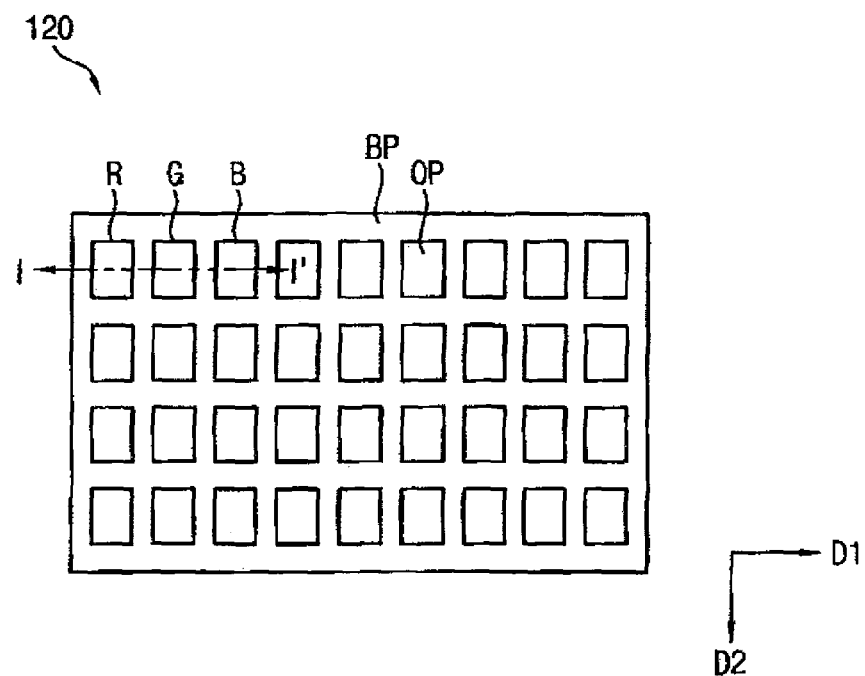
FIG. 3 is a plan view illustrating a second display substrate of FIG. 2.
Figure 4:
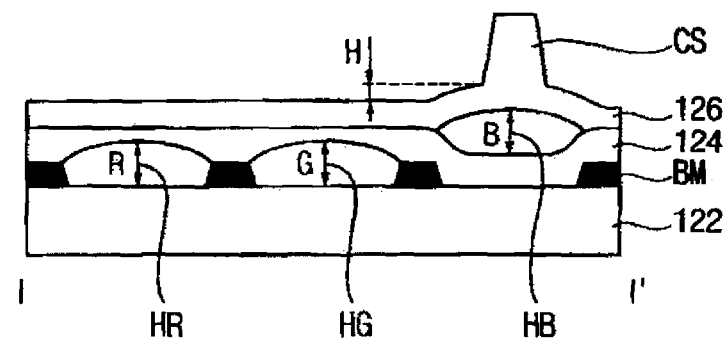
FIG. 4 is a cross-sectional view cut along line I-I' of FIG. 3.

A structure of the second display substrate 120 is explained referring to FIGS. 3 and 4 in detail.

The first display substrate 110 may further include, for example, a pixel electrode connected to the TFT. The second display substrate 120 may further include, for example, a common electrode facing the pixel electrode.

Alternatively, the first display substrate 110 may include, for example, both of the pixel electrode connected to the TFT and the common electrode facing the pixel electrode.

The light source part 200 provides light to the display panel 100. The light source part 200 may be disposed, for example, under the display panel 100. The light source part 200 includes a light source generating the light. For example, the light source part 200 may include at least one of a cold cathode fluorescent lamp ("CCFL"), an external electrode fluorescent lamp ("EEFL"), a flat fluorescent lamp ("FFL"), and a light emitting diode ("LED").

FIG. 3 is a plan view illustrating the second display substrate 120 of FIG. 2.

Referring to FIGS. 2 and 3, the display panel 100 includes, for example, a plurality of opening portions OP and a blocking portion BP defining the opening portions OP. The opening portion OP may be called a pixel area. For example, the pixel areas OP are separated from each other by the blocking portion BP. The pixel areas OP may be disposed in a matrix form.

The color filters R, G and B are disposed in the pixel areas OP. The light blocking pattern BM is disposed in the blocking portion BP. For example, a portion of the color filter R, G and B may overlap the blocking portion BP.

A single pixel area OP is, for example, surrounded by the blocking portion BP. The pixel area OP may have various shapes. For example, the pixel area OP may have a rectangular shape. For example, the pixel area OP may have a rectangular shape having a chamfered corner.

For example, the pixel area OP may have a rectangular shape including a shorter side extending in a first direction D1 and a longer side extending in a second direction D2 crossing the first direction D1. Alternatively, a shorter side of the pixel area OP may extend in the second direction D2. A longer side of the pixel area OP may extend in the first direction D1.

The light blocking pattern BM blocks a light from passing a portion between the adjacent pixel areas OP so that lights passing the pixel areas OP do not interfere with each other.

FIG. 4 is a cross-sectional view cut along line I-I' of FIG. 3.

Referring to FIGS. 2 and 4, the second display substrate 120 includes, for example, a base substrate 122, the first color filter R, the second color filter G and the third color filter B, an organic layer 124 and an overcoat layer 126. The second display substrate 120 may further include, for example, the light blocking pattern BM disposed between the color filters R, G and B. The second display substrate 120 may further include, for example, a column spacer CS to maintain a gap between the first display substrate 110 and the second display substrate 120.

The base substrate 122 may include, for example, glass or quartz. Alternatively, the base substrate 122 may include, for example, a flexible material such as polyethylene terephthalate (PET), polyethylene naphthalate (PEN), polyester ionomer, polyethersulfone (PES), polycarbonate (PC), polysulfone, a phenolic resin, an epoxy resin, polyester, polyimide, polyetherester, polyetheramide, cellulose nitrate, cellulose acetate, poly(vinyl acetate), polystyrene, polyolefins including polyolefin ionomers, polyamide, aliphatic polyurethanes, polyacrylonitrile, polytetrafluoroethylenes, polyvinylidene fluorides, poly(methyl (x-methacrylates), an aliphatic or cyclic polyolefin, polyarylate (PAR), polyetherimide (PEI), polyethersulphone (PES), polyimide (PI), Teflon poly(perfluoro-alboxy) fluoropolymer (PFA), poly(ether ether ketone) (PEEK), poly(ether ketone) (PEK), poly(ethylene tetrafluoroethylene)fluoropolymer (PETFE), and poly(methyl methacrylate) and various acrylate/methacrylate copolymers (PMMA).

The first color filter R is disposed on the base substrate 122. The first color filter R corresponds to a first region. The first region may be, for example, a red display region. The first region is defined by the light blocking patterns BM disposed on both sides of the first color filter R.

The second color filter G is disposed on the base substrate 122. The second color filter G corresponds to a second region. The second region may be, for example, a green display region. The second region is defined by the light blocking patterns BM disposed on both sides of the second color filter G.

The organic layer 124 is disposed on the base substrate 122, the first color filter R and the second color filter G. The organic layer 124 covers the first color filter R in the first region. The organic layer 124 covers the second color filter G in the second region. The organic layer 124 makes contact with an upper surface of the first color filter R in the first region. The organic layer 124 makes contact with an upper surface of the second color filter G in the second region. The organic layer 124 makes contact with the base substrate 122 in a third region corresponding to the third color filter B.

The organic layer 124 may be formed on an entire surface of the base substrate 122. The organic layer 124 is formed using, for example, a liquid organic material. The organic layer 124 may be formed using, for example, a liquid organic material having viscosity. The organic layer 124 may be formed using, for example, a transparent organic material. For example, in an exemplary embodiment, the organic layer 124 may be formed of a transparent organic material such as an acrylic resin, a BCB (Benzocyclobutene) and/or a polyimide resin.

A thickness of the organic layer 124 formed on the first color filter R may be, for example, substantially the same as a thickness of the organic layer 124 formed on the second color filter G. A thickness of the organic layer 124 formed on the base substrate 122 in the third region may be, for example, greater than the thickness of the organic layer 124 formed on the first color filter R and the thickness of the organic layer 124 formed on the second color filter G.

The third color filter B is disposed on the organic layer 124. The third color filter B corresponds to the third region. The third region may be, for example, a blue display region. The third region is defined by the light blocking patterns BM disposed on both sides of the third color filter B.

The overcoat layer 126 is disposed on the organic layer 124 and the third color filter B. The overcoat layer 126 makes contact with the organic layer 124 in the first and second regions. The overcoat layer 126 makes contact with an upper surface of the third color filter B in the third region.

The overcoat layer 126 may be formed on an entire surface of the base substrate 122. The overcoat layer 126 may be formed using, for example, a liquid material. The overcoat layer 126 may be formed using, for example, a liquid material having viscosity. The overcoat layer 126 may include, for example, a transparent photo resist material. For example, the overcoat layer 126 may include a negative photo resist material.

A height of an upper surface of the overcoat layer 126 corresponding to the first color filter R and the second color filter G is, for example, different from a height of an upper surface of the overcoat layer 126 corresponding to the third color filter B. For example, the upper surface of the overcoat layer 126 corresponding to the third color filter B is higher than the upper surface of the overcoat layer 126 corresponding to the first color filter R and the second color filter G by about 0.2 μm to about 0.3 μm.

A thickness HR of the first color filter R, a thickness HG of the second color filter G and a thickness HB of the third color filter B may be, for example, substantially the same as one another. The third color filter B has the thickness HB substantially the same as the thickness HR of the first color filter R and the thickness HG of the second color filter G. However, the organic layer 124 corresponding to the third color filter B is, for example, relatively thicker than the organic layer 124 corresponding to the first and second color filters R and G, so that the upper surface of the overcoat layer 126 in the third region is higher than the upper surface of the overcoat layer 126 in the first and second regions.

According to the present exemplary embodiment, the third color filter B is not required to be formed thicker than the first and second color filters R and G to set a cell gap in the third region to be less than a cell gap in the first and second regions. Thus, productivity and reliability of a display panel having a multi cell gap may be increased.

Figure 6:
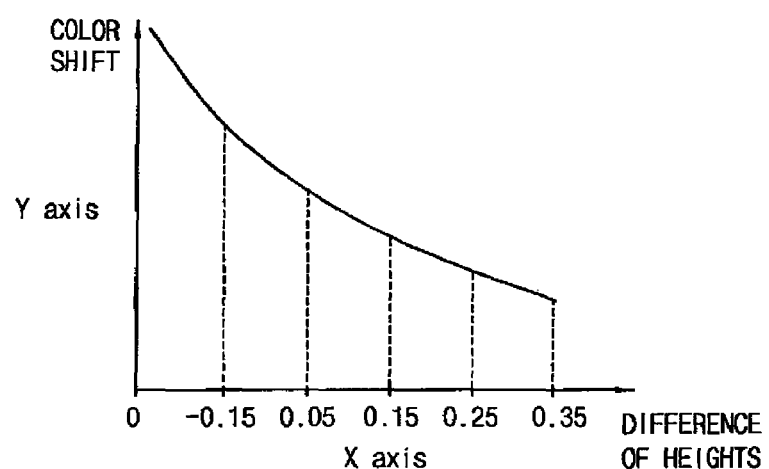
FIG. 6 is a graph illustrating a color shift according to a difference of heights of the color filters of the second display substrate of FIG. 2.
Figure 7:
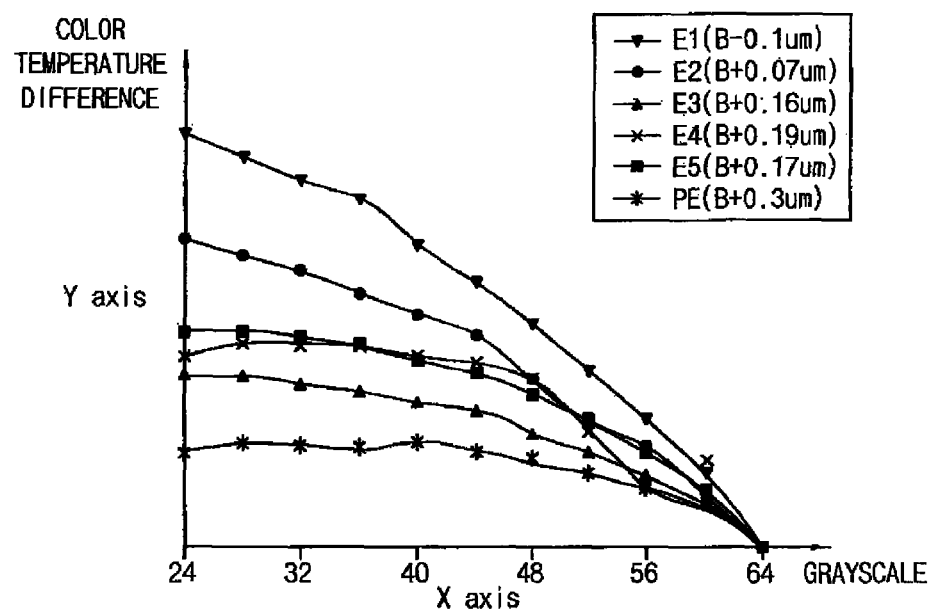
FIG. 7 is a graph illustrating a difference of color temperature according to a difference of heights of the color filters of the second display substrate of FIG. 2 and a grayscale.

The height difference between the overcoat layer 126 corresponding to the first to third regions is explained in detail referring to FIGS. 6 and 7.

The column spacer CS is disposed on the overcoat layer 126. In the present exemplary embodiment, the column spacer CS is, for example, integrally formed with the overcoat layer 126. Thus, the column spacer CS has a material substantially the same as a material of the overcoat layer 126. Alternatively, in an exemplary embodiment, the column spacer CS may be formed independently of the overcoat layer 126.

The column spacer CS may be disposed in the third region corresponding to the third color filter B. The cell gap in the third region is, for example, less than the cell gap in the first and second regions. Thus, a height of the column spacer CS may decrease when the column spacer CS is formed in the third region compared to the first and second regions. Alternatively, the column spacer CS may be disposed, for example, in at least one of the first and second regions.

The light blocking pattern BM may be formed on the base substrate 122, for example, before forming the color filters R, G and B. Alternatively, the light blocking pattern BM may be formed, for example, on the base substrate 122 corresponding to boundaries between the color filters R, G and B after forming the color filters R, G and B.

FIGS. 5A to 5G are cross-sectional views illustrating a method of manufacturing the second display substrate 120 of FIG. 2.

Figure 5A:
FIGS. 5A to 5G are cross-sectional views illustrating a method of manufacturing the second display substrate of FIG. 2.

Referring to FIGS. 4 and 5A, the light blocking pattern BM is formed on the base substrate 122. The light blocking pattern BM may be, for example, black. The light blocking, pattern BM may be formed using, for example, a photo resist material. The light blocking pattern BM may be formed using, for example, a mask having a shape corresponding to the light blocking pattern BM by a light exposure process. The light blocking pattern BM may be formed of, for example, a black resin or opaque metallic material such as, for example, chromium.

Although not shown in figures, the light blocking pattern BM may be formed, for example, corresponding to the boundaries between the color filters R, G and B after forming the color filters R, G and B.

Figure 5B:

Referring to FIGS. 4 and 5B, the first color filter R is fowled on the base substrate 122 in the first region. The first color filter R may be formed, for example, using a photo resist material including a red pigment. The first color filter R may be formed, for example, using a mask having a shape corresponding to the first color filter R by a light exposure process.

Figure 5C:

Referring to FIGS. 4 and 5C, the second color filter G is formed on the base substrate 122 in the second region. The second color filter G may be formed using, for example, a photo resist material including a green pigment. The second color filter G may be formed using, for example, a mask having a shape corresponding to the second color filter G by a light exposure process.

Figure 5D:

Referring to FIGS. 4 and 5D, the organic layer 124 is formed on the base substrate 122, the first color filter R and the second color filter G. The organic layer 124 may be coated, for example, on an entire surface of the base substrate 122.

The organic layer 124 may be formed using, for example, a liquid organic material having viscosity. The height of the upper surface of the organic layer 124 corresponding to the first and second regions and the height of the upper surface of the organic layer 124 corresponding to the third region may be adjusted by, for example, the viscosity of the organic material and quantity of the organic material.

Figure 5E:
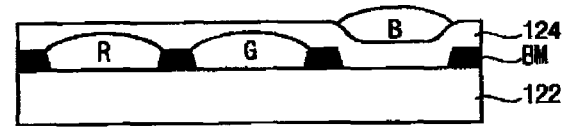

Referring to FIGS. 4 and 5E, the third color filter B is formed on the organic layer 124 in the third region. The third color filter B may be formed using, for example, a photo resist material including a blue pigment. The third color filter B may be formed using, for example, a mask having a shape corresponding to the third color filter B by a light exposure process. It is noted that exemplary embodiments of the present invention are not limited to a red color filter R, a green color filter G and a blue color filter B. For example, alternatively, the color filters may include a cyan color filter C, a magenta color filter M, a yellow color filter Y and a black color filter BL.

Figure 5F:
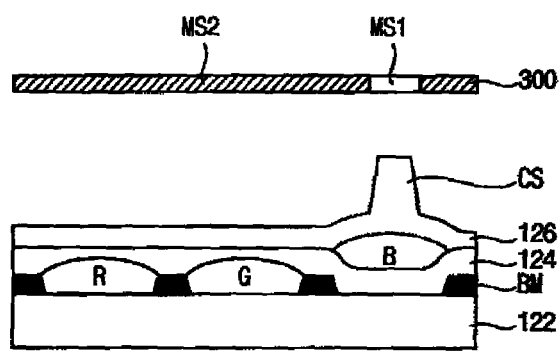
Figure 5G:
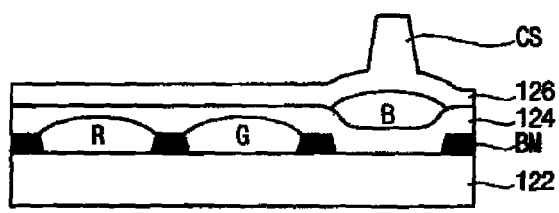

Referring to FIGS. 4, 5F and 5G, the overcoat layer 126 is formed on the organic layer and the third color filter B. The column spacer CS is formed, for example, substantially simultaneously with the overcoat layer 126. The column spacer CS may be formed in the third region.

The overcoat layer 126 may be coated, for example, corresponding to an entire surface of the base substrate 122. The overcoat layer 126 and the column spacer CS may be formed, for example, using a transparent photo resist material. The overcoat layer 126 and the column spacer CS may be formed, for example, using a negative photo resist material.

The overcoat layer 126 and the column spacer CS may be formed, for example, using a mask 300 having a shape corresponding to the overcoat layer 126 and the column spacer CS. The mask 300 has, for example, a hole portion MS1 corresponding to the column spacer CS and a halftone portion MS2 not corresponding to the column spacer CS.

For example, when a light is exposed on the mask 300, relatively more photo resist material remains corresponding to the hole portion MS1 and relatively less photo resist material remains corresponding to the halftone portion MS2 so that the column spacer CS having a relatively thick thickness is formed corresponding to the hole portion MS1 and the overcoat layer 126 having a relatively thin thickness is formed corresponding to the halftone portion MS2.

Alternatively, in an exemplary embodiment, the column spacer CS may instead be formed, for example, using a positive photo resist material.

FIG. 6 is a graph illustrating a color shift according to a difference of heights of the color filters R, G and B of the second display substrate 120 of FIG. 2. FIG. 7 is a graph illustrating a difference of color temperature according to a difference of heights of the color filters R, G and B of the second display substrate 120 of FIG. 2 and a grayscale.

Herein, a difference of heights of the color filters R, G and B may be, for example, substantially the same as a difference of heights of the upper surface of the overcoat layer 126 corresponding to the color filters R, G and B.

The difference of heights at an X axis in FIG. 6 means a difference (H in FIG. 4) between a height of the upper surface of the overcoat layer 126 corresponding to the third color filter B and a height of the upper surface of the overcoat layer 126 corresponding to the first and second color filters R and G. A color shift at a Y axis in FIG. 6 means a degree of color shift according to a position in the display panel 100. When the degree of the color shift increases, the uniformity of a color coordinate decreases so that a display quality may be deteriorated.

Referring to FIGS. 2 and 6, as the upper surface of the overcoat layer 126 corresponding to the third color filter B gets higher than the upper surface of the overcoat layer 126 corresponding to the first and second color filters R and the degree of the color shift decreases.

As the difference between the height of the upper surface of the overcoat layer 126 corresponding to the third color filter B and the height of the upper surface of the overcoat layer 126 corresponding to the first and second color filters R and G increases, the degree of the color shift decreases. When the difference between the height of the upper surface of the overcoat layer 126 corresponding to the third color filter B and the height of the upper surface of the overcoat layer 126 corresponding to the first and second color filters R and G excessively increases, a white color coordinate of the display panel 100 may be yellowish. Thus, the difference between the height of the upper surface of the overcoat layer 126 corresponding to the third color filter B and the height of the upper surface of the overcoat layer 126 corresponding to the first and second color filters R and G may be properly set.

A grayscale at an X axis in FIG. 7 means a grayscale of a display image, and a color temperature difference at a Y axis in FIG. 7 means a difference of the color temperature between 64 grayscales and the grayscale of the display image. When the color temperature difference increases, the uniformity of the color temperature according to the grayscale of the display image decreases so that a display quality is deteriorated.

E1 is a case in which the subtraction of the height of the overcoat layer 126 corresponding to the third color filter B from the height of the overcoat layer 126 corresponding to the first and second color filters R and G is about −0.1 μm. E2 is a case in which the subtraction of the height of the overcoat layer 126 corresponding to the third color filter B from the height of the overcoat layer 126 corresponding to the first and second color filters R and G is about 0.07 μm. E3 is a case in which the subtraction of the height of the overcoat layer 126 corresponding to the third color filter B from the height of the overcoat layer 126 corresponding to the first and second color filters R and G is about 0.16 μm. E4 is a case in which the subtraction of the height of the overcoat layer 126 corresponding to the third color filter B from the height of the overcoat layer 126 corresponding to the first and second color filters R and G is about 0.19 μm. E5 is a case in which the subtraction of the height of the overcoat layer 126 corresponding to the third color filter B from the height of the overcoat layer 126 corresponding to the first and second color filters R and G is about 0.17 μm. In the present exemplary embodiment, PE is a case in which the subtraction of the height of the overcoat layer 126 corresponding to the third color filter B from the height of the overcoat layer 126 corresponding to the first and second color filters R and G is about 0.30 μm.

Referring to FIGS. 2 to 7, when the upper surface of the overcoat layer 126 corresponding to the third color filter B is higher than the upper surface of the overcoat layer 126 corresponding to the first and second color filters R and G by, for example, about 0.3 μm, the color temperature difference is relatively less compared to E1 to E5 so that the color temperature is relatively uniform according to the grayscale of the display image.

Referring to FIGS. 6 and 7, the upper surface of the overcoat layer 126 corresponding to the third color filter B should be higher than the upper surface of the overcoat layer 126 corresponding to the first and second color filters R and G by, for example, about 0.2 μm to about 0.3 μm.

According to the present exemplary embodiment, the height of the upper surface of the overcoat layer 126 corresponding to the third color filter B is different from the height of the upper surface of the overcoat layer 126 corresponding to the first and second color filters R and G so that the color shift may be decreased. Thus, the display quality may be increased.

Figure 8:
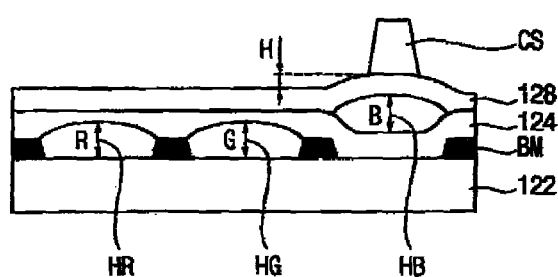
FIG. 8 is a cross-sectional view illustrating a second display substrate according to an exemplary embodiment of the present invention.

FIG. 8 is a cross-sectional view illustrating a second display substrate according to an exemplary embodiment of the present invention.

The display substrate, the method of manufacturing the display substrate and the display panel according to the present exemplary embodiment are substantially the same as the display apparatus, the method of manufacturing the display substrate and the display panel explained referring to FIGS. 1 to 7 except that a column spacer CS is formed independently from an overcoat layer 128. Thus, the same reference numerals will be used to refer to the same or like parts as those described in FIGS. 1 to 7 and any repetitive explanation concerning the above elements will be omitted.

Referring to FIGS. 1 to 3 and 8, the display apparatus includes, for example, a display panel 100 and a light source part 200.

The display panel 100 includes, for example, a first display substrate 110, a second display substrate 120 and a liquid crystal layer 130 disposed between the first and second display substrates 110 and 120.

The second display substrate 120 includes, for example, a base substrate 122, a first color filter R, a second color filter G and a third color filter B, an organic layer 124 and an overcoat layer 128. The second display substrate 120 may further include, for example, the light blocking pattern BM disposed between the color filters R, G and B. The second display substrate 120 may further include, for example, a column spacer CS to maintain a gap between the first display substrate 110 and the second display substrate 120.

The first color filter R is disposed on the base substrate 122. The first color filter R corresponds to a first region. The first region may be, for example, a red display region. The second color filter G is disposed on the base substrate 122. The second color filter G corresponds to a second region. The second region may be, for example, a green display region.

The organic layer 124 is disposed on, for example, the base substrate 122, the first color filter R and the second color filter G. The organic layer 124 makes contact with, for example, the base substrate 122 in a third region corresponding to the third color filter B.

The third color filter B is disposed on the organic layer 124. The third color filter B corresponds to the third region. The third region may be, for example, a blue display region.

It is noted that exemplary embodiments of the present invention are not limited to a red color filter R, a green color filter G and a blue color filter B. For example, alternatively, the color filters may include a cyan color filter C, a magenta color filter M, a yellow color filter Y and a black color filter BL.

The overcoat layer 128 is disposed on, for example, the organic layer 124 and the third color filter B. A height of an upper surface of the overcoat layer 128 corresponding to the first color filter R and the second color filter G is, for example, different from a height of an upper surface of the overcoat layer 128 corresponding to the third color filter B. For example, the upper surface of the overcoat layer 128 corresponding to the third color filter B is higher than the upper surface of the overcoat layer 128 corresponding to the first color filter R and the second color filter G by about 0.2 µm to about 0.3 µm.

The column spacer CS is disposed on the overcoat layer 128. In the present exemplary embodiment, the column spacer CS is formed, for example, independently from the overcoat layer 128. For example, the column spacer CS may include a material different from a material of the overcoat layer 128. In the present exemplary embodiment, the overcoat layer 128 may include, for example, a transparent organic material. The column spacer CS may include, for example, a transparent photo resist material. Alternatively, the column spacer CS may include, for example, a material which is substantially the same as a material of the overcoat layer 128. The column spacer CS may be disposed, for example, in the third region corresponding to the third color filter B.

FIGS. 9A to 9G are cross-sectional views illustrating a method of manufacturing the second display substrate 120 of FIG. 8.

Figure 9A:
FIGS. 9A to 9G are cross-sectional views illustrating a method of manufacturing the second display substrate of FIG. 8.

Referring to FIGS. 8 and 9A, the light blocking pattern BM is formed on the base substrate 122. The light blocking pattern BM may be formed using, for example, a mask having a shape corresponding to the light blocking pattern BM by a light exposure process. Moreover, the light blocking pattern BM may be formed of, for example, a black resin or opaque metallic material such as, for example, chromium.

Figure 9B:

Referring to FIGS. 8 and 9B, the first color filter R is formed on the base substrate 122 in the first region. The first color filter R may be formed, for example, using a mask having a shape corresponding to the first color filter R by a light exposure process.

Figure 9C:

Referring to FIGS. 8 and 9C, the second color filter G is formed on the base substrate 122 in the second region. The second color filter G may be formed, for example, using a mask having a shape corresponding to the second color filter G by a light exposure process.

Figure 9D:
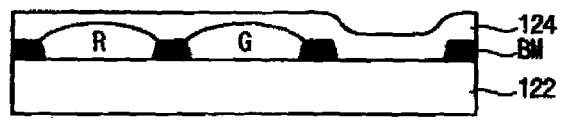

Referring to FIGS. 8 and 9D, the organic layer 124 is formed, for example, on the base substrate 122, the first color filter R and the second color filter G. The organic layer 124 may be coated, for example, on an entire surface of the base substrate 122.

Figure 9E:

Referring to FIGS. 8 and 9E, the third color filter B is formed, for example, on the organic layer 124 in the third region. The third color filter B may be formed, for example, using a mask having a shape corresponding to the third color filter B by a light exposure process.

Figure 9F:
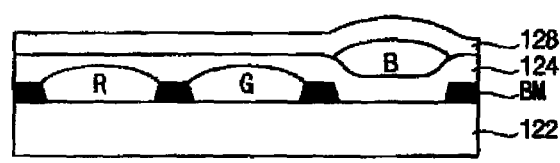

Referring to FIGS. 8 and 9F, the overcoat layer 128 is formed, for example, on the organic layer 124 and the third color filter B.

The overcoat layer 128 may be coated, for example, on an entire surface of the base substrate 122. The overcoat layer 128 may be formed, for example, using a liquid organic material. The overcoat layer 128 may be formed, for example, using a liquid organic material having viscosity. The overcoat layer 128 may be formed using, for example, a transparent organic material. In the present exemplary embodiment, the overcoat layer 128 may include, for example, a material which is substantially the same as a material of the organic layer 124.

It is noted that exemplary embodiments of the present invention are not limited to a red color filter R, a green color filter G and a blue color filter B. For example, alternatively, the color filters may include a cyan color filter C, a magenta color filter M, a yellow color filter Y and a black color filter BL.

Figure 9G:
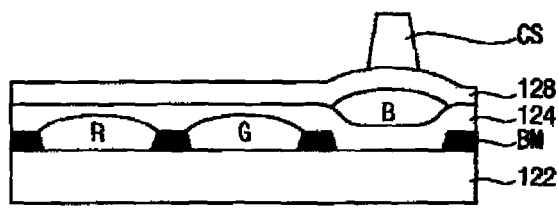

Referring to FIGS. 8 and 9G, the column spacer CS may be formed on the overcoat layer 128. The column spacer CS may be formed in, for example, the third region.

The column spacer CS may be formed, for example, using a transparent photo resist material. The column spacer CS may be formed, for example, using a negative photo resist material.

The column spacer CS is formed using, for example, a mask having a shape corresponding to the column spacer CS. The mask may have, for example, a hole portion corresponding to the column spacer CS.

Alternatively, in an exemplary embodiment, the column spacer CS may instead be formed, for example, using a positive photo resist material.

According to the present exemplary embodiment, the upper surface of the overcoat layer 128 corresponding to the third color filter B is different from the upper surface of the overcoat layer 128 corresponding to the first and second color filters R and G so that the color shift may be decreased. Thus, the display quality may be increased.

According to the present exemplary embodiment of the present invention as explained above, a cell gap corresponding to the third color filter is set by the organic layer disposed between the third color filter and the base substrate. Accordingly, the display panel has a multi cell gap so that the color shift may decrease. Thus, the display quality may be increased.

Having described exemplary embodiments of the present invention, it is further noted that it is readily apparent to those of ordinary skill in the art that various modifications may be made without departing from the spirit and scope of the invention which is defined by the metes and bounds of the appended claims.

What is claimed is:

1. A method of manufacturing a display substrate, the method comprising:
    forming a first color filter on a base substrate in a first region;
    forming a second color filter on the base substrate in a second region;
    forming an organic layer on the base substrate, the first color filter and the second color filter;
    forming a third color filter on the organic layer in a third region; and
    forming an overcoat layer on the organic layer and the third color filter.

2. The method of claim 1, wherein a height of an upper surface of the overcoat layer corresponding to the first color filter and the second color filter is different from a height of an upper surface of the overcoat layer corresponding to the third color filter.

3. The method of claim 2, wherein the upper surface of the overcoat layer corresponding to the third color filter is higher than the upper surface of the overcoat layer corresponding to the first color filter and the second color filter by about 0.2 μm to about 0.3 μm.

4. The method of claim 2, wherein a thickness of the first color filter, a thickness of the second color filter and a thickness of the third color filter are substantially the same as one another.

5. The method of claim 1, wherein the first color filter is a red color filter, the second color filter is a green color filter and the third color filter is a blue color filter.

6. The method of claim 1, further comprising forming a column spacer on the overcoat layer.

7. The method of claim 6, wherein the column spacer is formed substantially simultaneously with the overcoat layer.

8. The method of claim 7, wherein the overcoat layer and the column spacer each include a transparent photo resist material.

9. The method of claim 8, wherein the overcoat layer and the column spacer are formed using a mask, and
wherein the mask has a hole portion corresponding to the column spacer and a halftone portion not corresponding to the column spacer.

10. The method of claim 6, wherein the column spacer is formed in the third region.

11. A display substrate comprising:
a base substrate;
a first color filter disposed on the base substrate in a first region;
a second color filter disposed on the base substrate in a second region;
an organic layer disposed on the base substrate, the first color filter and the second color filter;
a third color filter disposed on the organic layer in a third region; and
an overcoat layer disposed on the organic layer and the third color filter.

12. The display substrate of claim 11, wherein a height of an upper surface of the overcoat layer corresponding to the first color filter and the second color filter is different from a height of an upper surface of the overcoat layer corresponding to the third color filter.

13. The display substrate of claim 12, wherein the upper surface of the overcoat layer corresponding to the third color filter is higher than the upper surface of the overcoat layer corresponding to the first color filter and the second color filter by about 0.2 μm to about 0.3 μm.

14. The display substrate of claim 12, wherein a thickness of the first color filter, a thickness of the second color filter and a thickness of the third color filter are substantially the same as one another.

15. The display substrate of claim 11, wherein the first color filter is a red color filter, the second color filter is a green color filter and the third color filter is a blue color filter.

16. The display substrate of claim 11, further comprising a column spacer disposed on the overcoat layer.

17. The display substrate of claim 16, wherein the column spacer includes a material substantially the same as a material of the overcoat layer, and
wherein the column spacer is integrally formed with the overcoat layer.

18. The display substrate of claim 16, wherein the column spacer is disposed in the third region.

19. A display panel comprising:
a first display substrate including a thin film transistor;
a second display substrate facing the first display substrate, wherein the second display substrate including a base substrate, a first color filter disposed on the base substrate in a first region, a second color filter disposed on the base substrate in a second region, an organic layer disposed on the base substrate, the first color filter and the second color filter, a third color filter disposed on the organic layer in a third region and an overcoat layer disposed on the organic layer and the third color filter; and
a liquid crystal layer disposed between the first and second display substrates.

20. The display panel of claim 19, wherein a first cell gap between the first and second display substrates corresponding to the first color filter and the second color filter is different from a second cell gap between the first and second display substrates corresponding to the third color filter.

21. The display panel of claim 19, wherein the first cell gap is greater than the second cell gap by about 0.2 μm to about 0.3 μm.

22. A method for manufacturing a display substrate comprising:
forming a light blocking pattern on a base substrate, wherein the light blocking pattern defines a first region, a second region and a third region on the base substrate;
forming a first color filter on the base substrate in between opposing sidewalls of the light blocking pattern in the first region;
forming a second color filter on the base substrate in between opposing sidewalls of the light blocking pattern in the second region;
forming an organic layer on the base substrate, the first color filter, and the second color filter;
forming a third color filter on the organic layer in between opposing sidewalls of the light blocking pattern in the third region;
forming an overcoat layer on the organic layer and the third color filter; and
forming a column spacer on the overcoat layer,
wherein an upper surface of the overcoat layer corresponding to the third color filter is higher than an upper surface of the overcoat layer corresponding to the first color filter and the second color filter.

23. The method of claim 22, wherein the light blocking pattern is black.

24. The method of claim 22, wherein the light blocking pattern is formed using a mask having a shape corresponding to the light blocking pattern by a light exposure process.

25. The method of claim 22, wherein the column spacer is formed substantially simultaneously with the overcoat layer, wherein the column spacer and the overcoat layer are formed using a mask having a shape corresponding to the overcoat layer and the column spacer, and wherein the mask includes a hole portion corresponding to the column spacer and a halftone portion not corresponding to the column spacer.

26. The method of claim 22, wherein the column spacer is disposed in the third region on the overcoat layer corresponding to the third color filter after overcoat layer is formed.

27. The method of claim 26, wherein the column spacer is formed using a mask having a shape corresponding to the column spacer, and wherein the mask includes a hole portion corresponding to the column spacer.

28. The method of claim 22, wherein the upper surface of the overcoat layer corresponding to the third color filter is higher than the upper surface of the overcoat layer corresponding to the first color filter and the second color filter by about 0.2 μm to about 0.3 μm, and wherein a thickness of the first color filter, a thickness of the second color filter and a thickness of the third color filter are substantially the same as one another.

29. The method of claim 28, wherein the first color filter is a red color filter, the second color filter is a green color filter and the third color filter is a blue color filter and wherein the column spacer is formed in the third region and overlaps with the blue color filter.

30. The method of claim 22, wherein the organic layer directly contacts an upper surface of the first color filter in the first region, an upper surface of the second color filter in the second region and with the base substrate in the third region.

* * * * *